United States Patent
Babu et al.

(10) Patent No.: US 11,604,838 B2
(45) Date of Patent: Mar. 14, 2023

(54) SYSTEM AND METHOD FOR HUMANIZING METADATA FOR EXISTING CUSTOMER FACING RESOURCES

(71) Applicant: Dell Products L.P., Round Rock, TX (US)

(72) Inventors: Rathi Babu, Bangalore (IN); Mainak Roy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/896,627

(22) Filed: Jun. 9, 2020

(65) Prior Publication Data
US 2021/0382943 A1  Dec. 9, 2021

(51) Int. Cl.
| | |
|---|---|
| *G06F 16/907* | (2019.01) |
| *G06F 16/9535* | (2019.01) |
| *G06Q 10/067* | (2023.01) |
| *G06F 16/951* | (2019.01) |

(52) U.S. Cl.
CPC .......... *G06F 16/907* (2019.01); *G06F 16/951* (2019.01); *G06F 16/9535* (2019.01); *G06Q 10/067* (2013.01)

(58) Field of Classification Search
CPC .. G06F 16/907; G06F 16/951; G06F 16/9535; G06F 16/908; G06F 16/909; G06F 16/953; G06F 16/9532; G06F 16/9538; G06F 16/9536; G06Q 10/067
See application file for complete search history.

(56) References Cited

U.S. PATENT DOCUMENTS

| | | | | |
|---|---|---|---|---|
| 2008/0271008 | A1* | 10/2008 | Dettori | G06F 8/24 717/168 |
| 2013/0166543 | A1* | 6/2013 | MacDonald | G06F 16/41 707/723 |
| 2016/0098416 | A1* | 4/2016 | Li | G06Q 30/0201 707/767 |
| 2018/0213299 | A1* | 7/2018 | Park | H04N 21/251 |

\* cited by examiner

*Primary Examiner* — Kris E Mackes
(74) *Attorney, Agent, or Firm* — Terrile, Cannatti & Chambers, LLP; Emmanuel A. Rivera (57) ABSTRACT

A system, method, and computer-readable medium are disclosed for implementing metadata. Metadata that describes content/resources related to products/services of a business is identified. Monitoring is performed as to products/services of a business. Gaps in existing metadata is determined based on the monitoring. Dynamic updates through edge optimized application program interface sets are performed on the existing metadata based on the determined gaps.

20 Claims, 5 Drawing Sheets

SYSTEM AND METHOD FOR HUMANIZING METADATA FOR EXISTING CUSTOMER FACING RESOURCES

BACKGROUND OF THE INVENTION

Field of the Invention

The present invention relates to the management of information handling systems. More specifically, embodiments of the invention provide a system, method, and computer-readable medium for humanizing metadata for customer facing resources using edge-optimized application program interfaces.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems include devices that are operated by customers or users. Metadata is data that provides information as to other data. In certain instances, these user devices implement metadata to access resources such as documents, videos, white papers, installation/product guides related to the user devices. For example, such resources include consumable information to the user. The resources may be available at different external support portals, such as various support sites, vendor sites, cloud based storage locations, etc. To access such resources, user devices store and use metadata.

The metadata used by user devices can remain static or unchanged until a proactive change or update is performed. There can be influencing factors, trends, and changes in business that affect user experience; however, if user facing metadata are not updated periodically, the correct information is not found during searches for resources when changes in technology, search patterns or business trends occur. If the metadata remains static, metadata cannot properly support the dynamically changing influencing factors, trends, and changes in business. In order to provide an optimum user experience support services should be able to understand dynamic changes in influencing factors, trends, and business and provide the appropriate metadata to support such.

SUMMARY OF THE INVENTION

A system, method, and computer-readable medium are disclosed for implementing metadata. Metadata that describes content/resources related to products/services of a business is identified. Monitoring is performed as to products/services of a business. Gaps in existing metadata is determined based on the monitoring. Dynamic updates are performed on the existing metadata based on the determined gaps.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for humanizing metadata for customer facing resources using edge-optimized application program interfaces. In certain implementations, metadata that should be address for user devices is identified. New or updated sets of metadata that are generated by enterprise industry are identified as well as usage pattern for such new and updated sets of metadata. In certain implementations, endpoint device metadata is optimized without altering or affecting actual source files.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
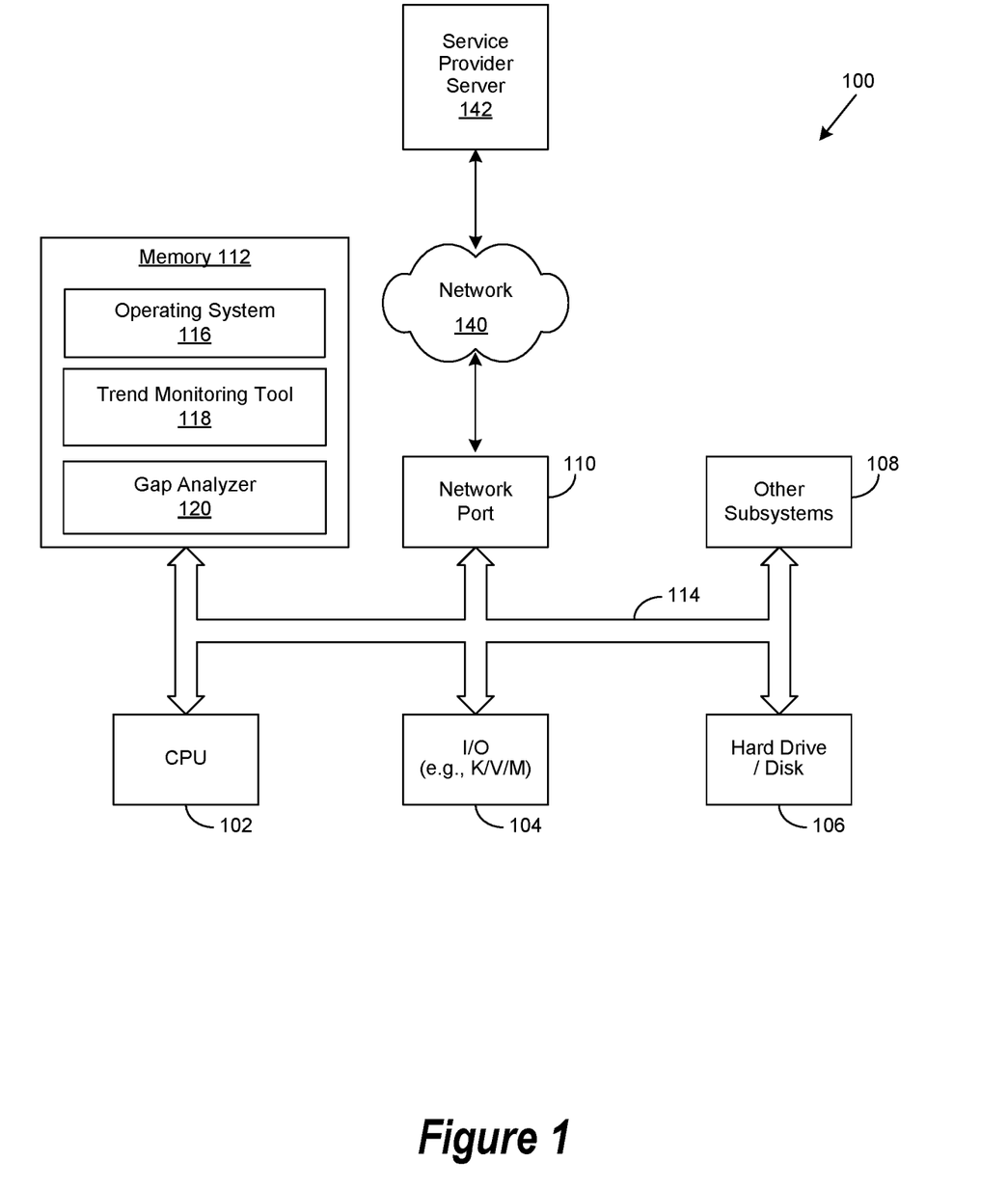
FIG. 1 is a general illustration of components of an information handling system as implemented in the system and method of the present invention.

FIG. 1 is a generalized illustration of an information handling system that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

The information handling system 100 likewise includes system memory 112, which is interconnected to the foregoing via one or more buses 114. System memory 112 further comprises operating system (OS) 116 and in various embodiments may also include a trend monitoring tool 118 and gap analyzer 120, as further described herein. In certain embodiments, the information handling system 100 is able to download the trend monitoring tool 118 and gap analyzer 120 from the service provider server 142. In another embodiment, the trend monitoring tool 118 and gap analyzer 120 is provided as a service from the service provider server 142.

Figure 2:
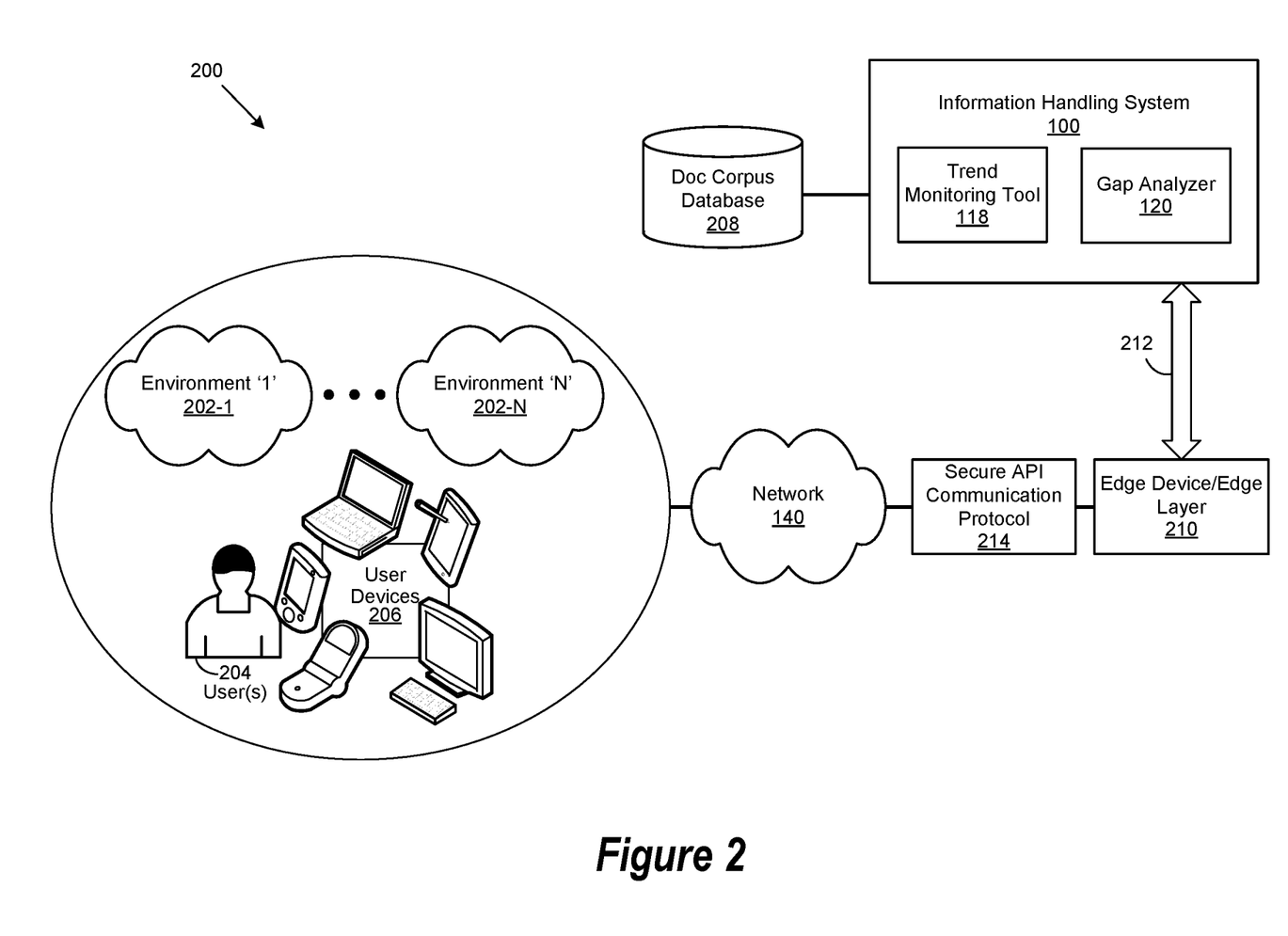
FIG. 2 is a simplified block diagram of a system that implements an information handling system to perform trend monitoring and identifying gaps of metadata for implementation in user devices.

FIG. 2 is a simplified block diagram of a system that implements an information handling system to perform trend monitoring and identifying gaps of metadata for implementation in user devices. The system 200 includes the information handling system 100. In certain implementations, the information handling system 100 is an infrastructure for a support site. As described in FIG. 1, the information handling system 100 includes the trend monitoring tool 118 and gap analyzer 120.

The trend monitoring tool 118 is configured to monitor search trends and analyze changes or fluctuations in search patterns of different products and/or services from various demographics or environments as represented by environment '1' 202-1 to environment 'N' 202-N. Environment '1' 202-1 to environment 'N' 202-N can be based on location and/or language. In particular, the trend monitoring tool 118 monitors changes in technology, search patterns or business trends occur affecting influencing factors, trends, and changes in business that affect user devices and/or services. In certain embodiments, the trend monitoring tool 118 is implemented on a separate platform or service, such as provided by Brightedge™.

In certain instances, environment '1' 202-1 to environment 'N' 202-N include customers or users, as represented by users 204. The users 204 can be customers of a business that use particular terms in their searches for content related to the business' products or services, where such products or services are represented as user devices 206. A user device 206 refers to an information handling system such as a personal computer, a laptop computer, a tablet computer, a personal digital assistant (PDA), a smart phone, a mobile telephone, or other device that is capable of communicating and processing data.

Although, the intent is not to influence and affect the way users 204 search and the terms that they search for, by monitoring their search patterns, changes in technology, or business trends occur that affect devices and/or services of the business, the business is able to change or provide content and support, and dynamically change or update metadata. In this sense, the metadata is "humanized" for trends of the users 204 and resources or content provided or supported by the business, which can be considered as existing customer facing resources.

The system 200 further provides for a document corpus database or doc corpus 208. In certain implementations, doc corpus 208 is a database for a business infrastructure support site. The doc corpus 208 stores metadata that are associated with different types of resources, such as documents, guides, white papers, videos, etc. The associated metadata can include specific key phrases and key product identifiers. These key phrases and key product identifiers are used for indexing the content. Metadata in doc corpus 208 is used by users 204 and particularly user devices 206. Whenever users 204 are using similar search strings of metadata in doc corpus 208, the users 204 are looking for such information. The doc corpus 208 includes existing sets of metadata in order to perform associate data from static to dynamic as further described herein.

The gap analyzer 120 is configured to identify gaps between changed variables and dynamically update metadata in doc corpus 208. In certain implementations, an edge layer or edge device 210 is provided between information handling system 100, where the information handling system 100 is an infrastructure for a support site. The gap analyzer 120 with the edge layer or edge device 210 can be considered as an interactive layer or edge optimized interactive layer that has the intelligence to identify gaps and initiate any corresponding tasks as identified. This edge optimized interactive layer is implemented between the application program interfaces (API) of the information handling system 110 and content, such that the existing infrastructure is not changed. In certain implementations, an API channel 212 is provided between information handling system 100 and the edge layer or edge device 210. In certain implementations, a secure API communication protocol 214 is provided between the edge layer or edge device 210 and the network. Through edge layer optimization, pre-defined document or metadata sets are updated in the interactive layer. Responses are differentiated based on search queries without altering source content. The edge layer optimization is further described herein.

Figure 3:
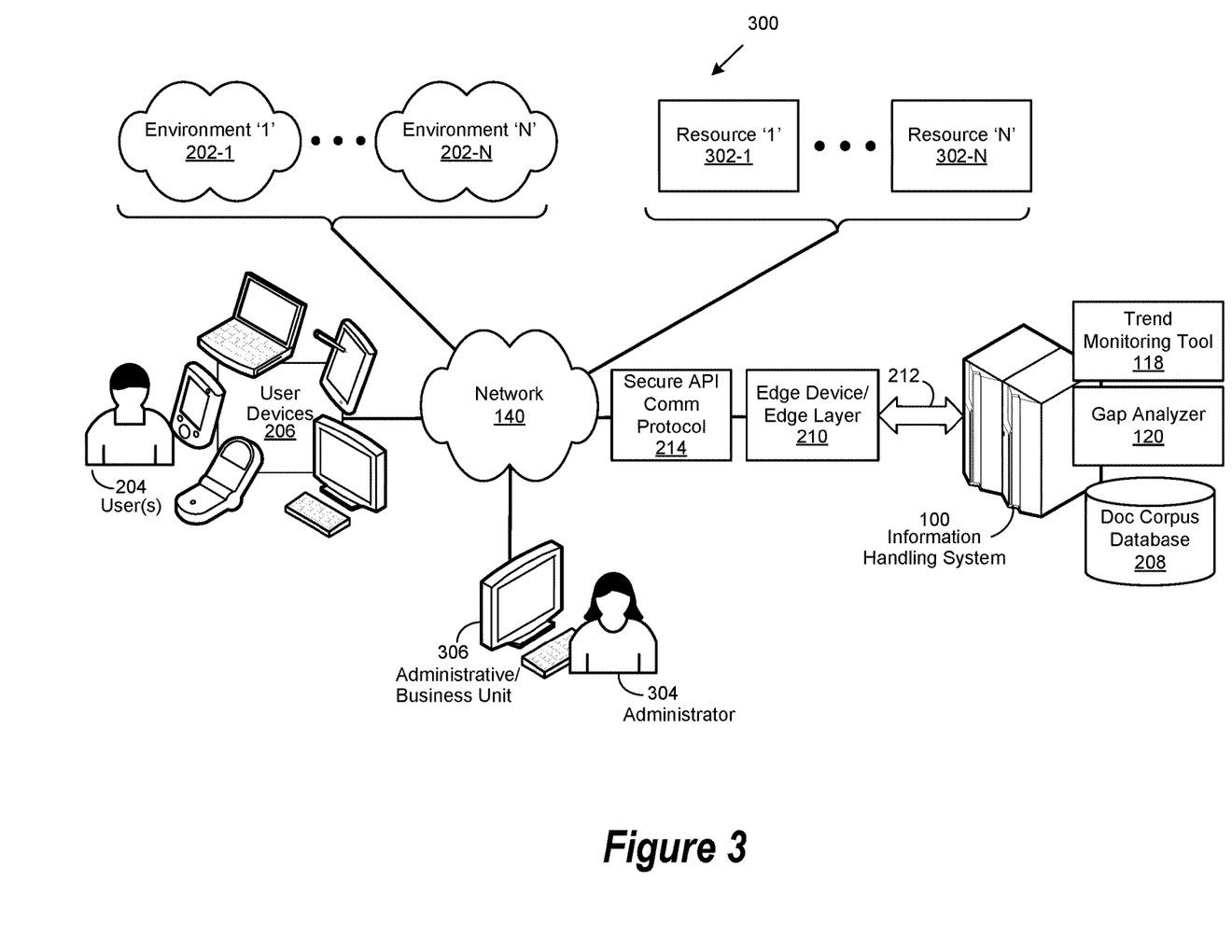
FIG. 3 is a simplified block diagram of a system that implements humanizing metadata for existing customer facing resources.

FIG. 3 is a simplified block diagram of a system that implements humanizing metadata for existing customer facing resources. The system 300 includes the information handling system 100. As described the information handling system 100 includes the trend monitoring tool 118, or in certain implementations, is configured to a platform that provides the services of trend monitoring tool 118. As described, the information handling system 100 includes the gap analyzer 120 and is configured with doc corpus 208.

The system 300 includes resource '1' 302-1 to resource 'N' 302-N that include resources such as documents, guides, white papers, videos, etc. that are associated with metadata. Resource '1' 302-1 to resource 'N' 302-N represent various sources, such as business websites, support platforms, third party support sites/platforms, cloud based depositories, etc. Metadata implemented at customer or user devices 206 is used to access the resources, where the resources can be considered as customer facing resources. In various implementations, the system 3000 provides for an administrator 304 though administrative/business unit system 306 accesses/controls the information handling system 100.

As described in FIG. 2, an edge optimized interactive layer is implemented through gap analyzer 120 and edge layer or edge device 210. The edge optimized interactive layer identifies gap or delta of existing metadata or data sets residing in doc corpus 208.

The gap analyzer 120 is configured to perform algorithms regarding decisions to be taken before applying gap or delta rules as to existing metadata. For example, there can be a decision as to any search terms found from environment '1' 202-1 to environment 'N' 202-N that are recent and associated with a business' products/services. Based on new trends, evolved search patterns, etc. new search terms and possible secondary terms can be provided. For example, secondary terms can refer to influences of a newly launched product or technologies are related to existing product lines, or in other words, associated products.

Another decision can be to determine which metadata needs to be added or subtracted. For example, during technical evolution, few search terms become obsolete as they become obvious for the products. In contrast, new search terms are associated with the products as the products provide latest aspects of technology.

Furthermore, another decision can be performed as to changes in real time analysis based on a search by region/ demographics request. In other words, data is adapted based on each request to provide accurate information. Therefore, the edge optimized interactive layer is active continuously to handle each case search query separately.

As discussed through the implementation through edge optimized interactive layer, the pre-defined metadata or document sets are updated by the edge optimized interactive layer, and the responses are differentiated based on the search query without altering source content.

Consider that information handling system 100 is an existing infrastructure for a support site and includes the doc corpus database 208. The edge optimized interactive layer that includes the gap analyzer 120 with the edge layer or edge device 210 performs metadata or document set changes outside of the information handling system 100 or existing infrastructure. The edge optimized interactive layer maintains a connection to the information handling system 100 and doc corpus database 208 and consumes the initial search queries. The edge optimized interactive layer provides API fetch attributes or API calls through API channel 212 based on the changes determined by gap analysis as to variation in trend, initiate or behavior patterns, etc. The API fetch attributes allow for changing terms.

Therefore, the edge optimized interactive layer identifies metadata gap based on changed variables and updates the associated metadata dynamically. To fetch the accurate data, the revised/reformed information is added to the API channel 212, that controls search responses.

The edge optimized interactive layer performs search queries from different endpoints, such as user devices 206, and environment '1' 202-1 to environment 'N' 202-N that include different location and/or language. The edge optimized interactive layer performs gap analysis, provides for location and language focused metadata or documents sets, performs metadata conversion, and provides metadata adoption for further instructions. Therefore, through the edge optimized interactive layer altered data/fetch instructions are provided to update metadata or documents sets, and updated metadata is made available to access accurate resources such as documents, guides, white papers, videos, etc.

As described herein, the edge optimized interactive layer identifies changes based on trends, demographic, and user behavior pattern. The edge optimized interactive layer is configured to identify gaps and perform tasks, such as determining what metadata is to be altered/change, what metadata is to be added or subtracted, perform real time analysis based on search queries as to location, language, and/or demographic. The doc corpus 208 can be updated based on the tasks performed at the edge optimized interactive layer.

In certain implementations, identifying metadata gap or delta for existing sets of metadata as stored in doc corpus 208 is performed as follows. The metadata gap is identified by a comparison algorithm that holds a set of parameters that are evaluated with existing content. In an implementation, the gap analyzer 120 performs the comparison algorithm. The set of parameters can be predefined by the business, or administrator 304. The comparison algorithm can change and evolve, and the gap analyzer 120 can be implemented with aa learning capability to adjust for such changes and evolution. When the gap analyzer 120 retrieves indications from multiple platforms, such as environment '1' 202-1 to environment 'N' 202-N that new sets of metadata are getting generated, gap analyzer 120 determines the usability of such metadata to. Therefore, based on the usability, new sets of metadata from other non-business or third party platforms can be evaluated by a business. If applicable, a new or revised set of metadata can be created from third-party platforms.

Therefore, gap analyzer 120 implements a set of pre-defined rules from the business, which can be configured by administrator 304 through administrative/business system 306. A change or delta of metadata is determined based on existing metadata set rules and new rule set. New metadata sets are identified, along with the purpose of the new metadata sets. Each new metadata set is determined to "obey" or "not obey" the rule set and accepted or not accepted based on the rule set.

Based on trend analysis, the impact on existing metadata in doc corpus 208 are identified. Doc corpus 208 includes existing and associated metadata sets that can include associated key phrases, business driven metadata, technology drive product differentiators, etc. Gap analysis is performed by gap analyzer 120 to identify metadata gaps for the business and products/services of the business, to identify influencing parameters, and to derive impacting factors. The gap analysis is based on recent trends as to changes, how such changes impact a business and products/services of the business and determining products and technology identifiers that are being used by competitors.

Figure 4:
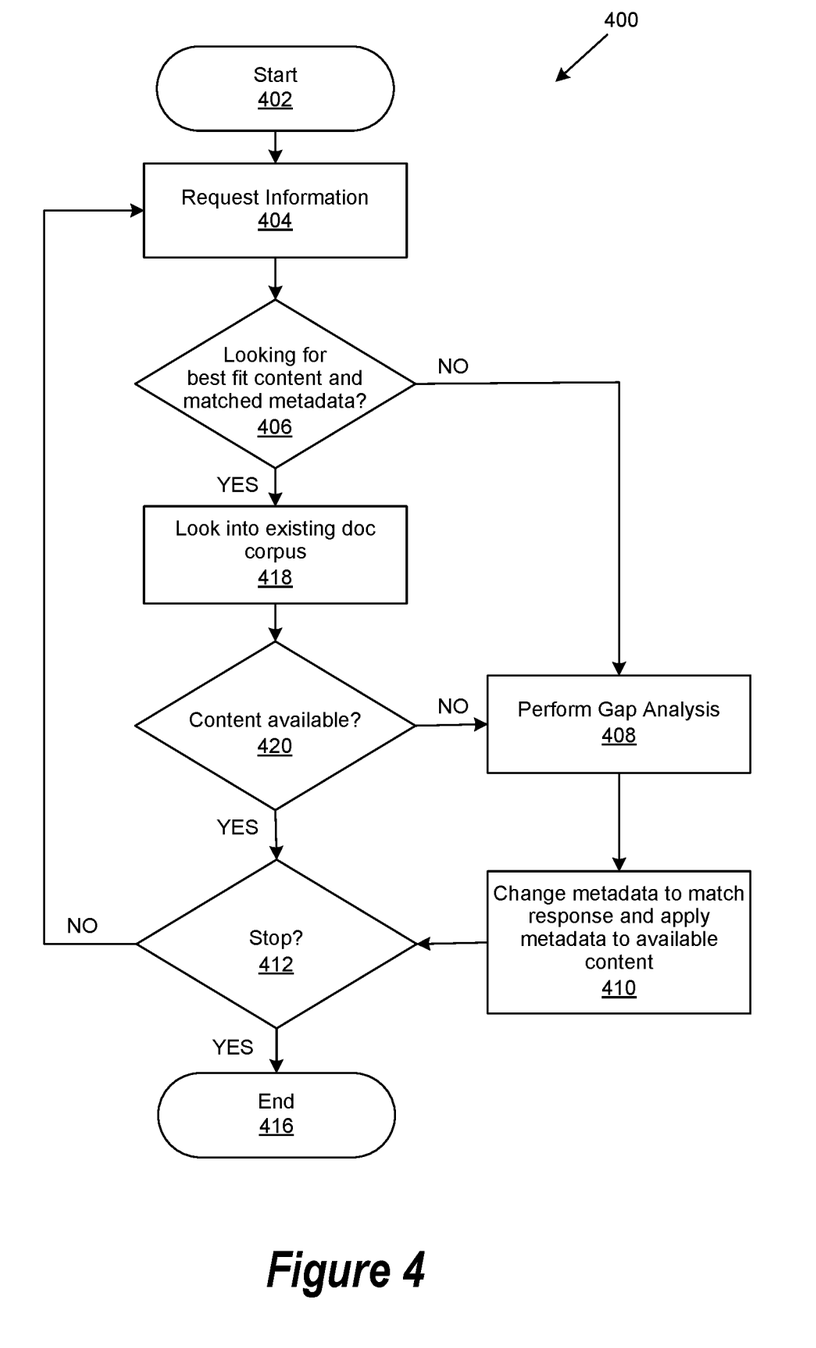
FIG. 4 is a generalized flowchart to implement edge optimization with application program interface (API) sets.

FIG. 4 is a generalized flowchart of the performance of operations implemented in accordance with an embodiment of the invention to implement edge optimization with API sets. The order in which the method is described is not intended to be construed as a limitation, and any number of the described method blocks may be combined in an y order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 402, the process 400 begins. At step 404, a request for information is performed by the information handling system 100, where the information handling system 100 can be an existing infrastructure for a support site and is configured to doc corpus 208 that stores metadata sets. The request can be sent from information handling system 100 by an API call.

At step 406 a determination is made whether to perform to look for best fit content or resource and their matched metadata. If the condition at step 406 is "NO", at step 408 a metadata gap analysis is performed. In certain implementations, the gap analysis is performed by gap analyzer 120.

At step 410, the metadata set is changed to match the response from the gap analysis, and the metadata is applied to available content or resources, such as content available at r resource '1' 302-1 to resource 'N' 302-N. Step 410 can be performed at the edge optimized interactive layer. A modified API response can be provided to the information handling system 100, with accurate and original information with modified metadata. Accurate content or information is made available to the information handling system 100.

At step 412, a determination is made to stop process 400. If the condition at step 412 is YES, the process 400 ends. If the condition at step 412 is NO, the process 400 goes back to step 404.

If the condition at step 406 is YES, at step 418, existing metadata is looked at. The existing metadata can be stored in doc corpus 208. At step 420, a determination is made if content is available. If the condition at step 420 is NO, at step 408 a metadata gap analysis is performed as described above. The process 400 proceeds to step 410 as described above and to step 412. If the condition at step 412 is YES, the process 400 ends. If the condition at step 412 is NO, the process 400 goes back to step 404.

Figure 5:
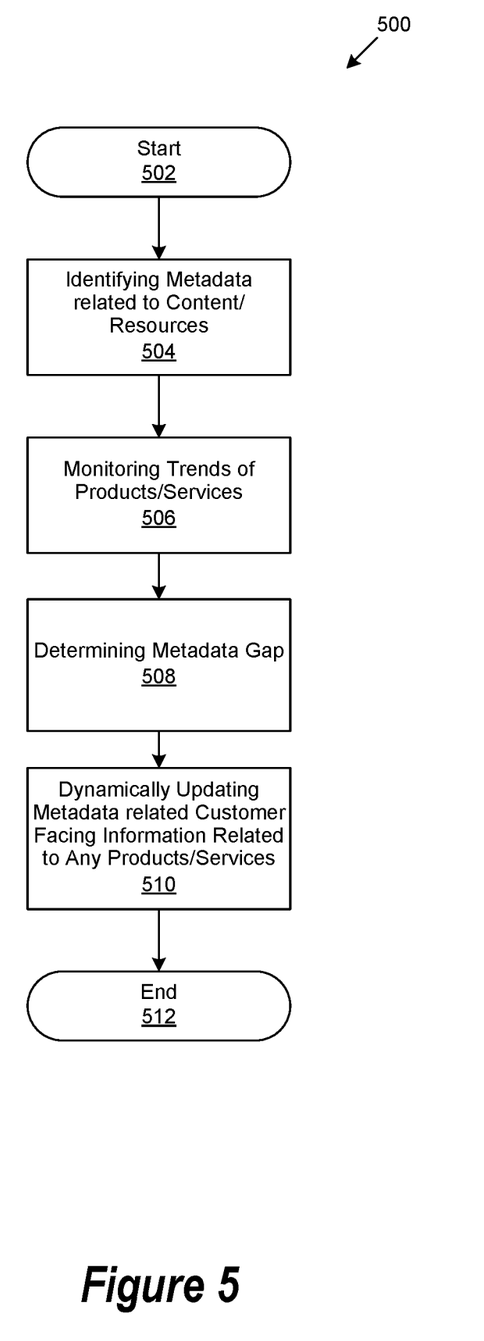
FIG. 5 is a generalized flowchart to implement humanizing metadata for customer facing resources using edge-optimized application program interfaces.

FIG. 5 is a generalized flowchart of the performance of operations implemented in accordance with an embodiment of the invention to implement humanizing metadata for customer facing resources using edge-optimized application program interfaces. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 502, the process 500 begins. At step 504, identifying metadata describing content/resources is performed. In particular, the metadata and content/resources are related to a business' products/services.

At step 506, monitoring trends as to the business' products/services is performed. As described herein, the monitoring can be performed by trend monitoring tool 118 or a platform providing a service. Monitoring can be performed as to search trends and changes or fluctuations in search patterns of different products and/or services from various demographics or environments. In particular, monitoring is performed on trends related to users of the business' products/services.

At step 508, determining metadata gap is performed. As described herein, the determining can be performed by the gap analyzer 120. Determining can be performed by applying rules as to existing metadata and trends found in the monitoring of step 506.

At step 510, dynamically updating existing metadata related to products/services is performed. As described herein, the edge optimized interactive layer that includes the gap analyzer 120 and edge layer or edge device 210 can perform the updating. API calls are provided to and from the information handling system 100 and the edge optimized interactive layer. At block 512, the process 500 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method to implement metadata comprising:
   identifying metadata that describes content/resources related to products/services of a business, wherein the metadata dynamically changes or is updated by the business;
   monitoring trends and evolved search patterns as to the products/service of the business based on the identified metadata;
   providing new search terms and secondary terms if new trends are detected;
   determining metadata that describes the content/resources related to products/services of the business to be added or subtracted based on the monitored trends;
   determining gaps in existing metadata that describes the content/resources related to products/services of the business based on monitored trends;
   performing decisions to be taken as to applying gap rules or data rules to the existing metadata based on new trends or evolved search terms; and
   dynamically updating the existing metadata based on the gaps that are determined.

2. The method of claim 1, wherein the content/resources are found at different sources, including non-business sources.

3. The method of claim 1, wherein the monitoring trends is based on user search patterns.

4. The method of claim 1, wherein the monitoring is performed on different demographics, languages, and/or regions.

5. The method of claim 1, wherein the determining gaps comprises performing algorithms and rule sets.

6. The method of claim 5, wherein the algorithms and rule sets comprise predetermined parameters set by the business.

7. The method of claim 1, wherein the dynamically updating is performed through an edge optimized interactive layer.

8. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations to implement metadata and comprising instructions executable by the processor and configured for:
   identifying metadata that describes content/resources related to products/services of a business, wherein the metadata dynamically changes or is updated by the business;
   monitoring trends and evolved search patterns as to the products/service of the business based on identified based on the identified metadata;
   providing new search terms and secondary terms if new trends are detected;
   determining metadata that describes the content/resources related to products/services of the business to be added or subtracted based on the monitored trends;
   determining gaps in existing metadata that describes the content/resources related to products/services of the business based on monitored trends;
   performing decisions to be taken as to applying gap rules or data rules to the existing metadata based on new trends or evolved search terms; and
   dynamically updating the existing metadata based on the gaps that are determined.

9. The system of claim 8, wherein the content/resources are found at different sources, including non-business sources.

10. The system of claim 8, wherein the monitoring trends is based on user search patterns.

11. The system of claim 8, wherein the monitoring is performed on different demographics, languages, and/or regions.

12. The system of claim 8, wherein the determining gaps comprises performing algorithms and rule sets.

13. The system of claim 12, wherein the algorithms and rule sets comprise predetermined parameters set by the business.

14. The system of claim 12, wherein the dynamically updating is performed through an edge optimized interactive layer.

15. A non-transitory, computer-readable storage medium embodying computer program code, the computer program code comprising computer executable instructions configured for:
   identifying metadata that describes content/resources related to products/services of a business, wherein the metadata dynamically changes or is updated by the business;
   monitoring trends and evolved search patterns as to the products/service of the business based on the identified metadata;
   providing new search terms and secondary terms if new trends are detected;
   determining metadata that describes the content/resources related to products/services of the business to be added or subtracted based on the monitored trends;
   determining gaps in existing metadata that describes the content/resources related to products/services of the business based on monitored trends;
   performing decisions to be taken as to applying gap rules or data rules to the existing metadata based on new trends or evolved search terms; and
   dynamically updating the existing metadata based on the gaps that are determined.

16. The non-transitory, computer-readable storage medium of claim 15, wherein the content/resources are found at different sources, including non-business sources.

17. The non-transitory, computer-readable storage medium of claim 15, wherein the monitoring trends is based on user search patterns.

18. The non-transitory, computer-readable storage medium of claim 15, wherein the monitoring is performed on different demographics, languages, and/or regions.

19. The non-transitory, computer-readable storage medium of claim 15, wherein the determining gaps comprises performing algorithms and rule sets.

20. The non-transitory, computer-readable storage medium of claim 15, wherein the dynamically updating is performed through an edge optimized interactive layer.

\* \* \* \* \*